(12) United States Patent
Furumoto

(10) Patent No.: US 10,475,403 B2
(45) Date of Patent: Nov. 12, 2019

(54) DISPLAY DEVICE AND CONTROL METHOD THEREOF WITH BRIGHTNESS AND TRANSMITTANCE CONTROL

(71) Applicant: CANON KABUSHIKI KAISHA, Tokyo (JP)

(72) Inventor: Yoshihisa Furumoto, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/955,109

(22) Filed: Apr. 17, 2018

(65) Prior Publication Data

US 2018/0233095 A1 Aug. 16, 2018

Related U.S. Application Data

(62) Division of application No. 14/816,607, filed on Aug. 3, 2015, now Pat. No. 9,978,319.

(30) Foreign Application Priority Data

Aug. 8, 2014 (JP) .................................. 2014-162831
May 12, 2015 (JP) .................................. 2015-097259

(51) Int. Cl.
*G09G 3/36* (2006.01)
*G09G 3/34* (2006.01)
*G02F 1/1347* (2006.01)
*G02F 1/1335* (2006.01)

(52) U.S. Cl.
CPC ............. *G09G 3/36* (2013.01); *G02F 1/1347* (2013.01); *G09G 3/3426* (2013.01); *G02F 2001/133601* (2013.01); *G09G 2300/023* (2013.01); *G09G 2320/0233* (2013.01); *G09G 2320/0238* (2013.01); *G09G 2320/066* (2013.01)

(58) Field of Classification Search
CPC ............... G09G 3/3426; G09G 3/3406; G09G 2300/23; G09G 2320/0233; G09G 2320/066
See application file for complete search history.

(56) References Cited

U.S. PATENT DOCUMENTS 7,796,179 B2    9/2010 Fujinawa et al.
2007/0159449 A1*  7/2007 Yoo ..................... G09G 3/3406
                                                345/102
2008/0309811 A1  12/2008 Fujinawa et al.
(Continued)

FOREIGN PATENT DOCUMENTS

JP          5-88197 A    4/1993
JP      2002-099250 A    4/2002

*Primary Examiner* — Xuemei Zheng
(74) *Attorney, Agent, or Firm* — Venable LLP

(57) ABSTRACT

Provided is a display device including: a first panel of which light transmittance is controlled; a second panel of which light transmittance is controlled, the second panel being disposed on the rear surface side of the first panel; a light emitting unit of which brightness is individually controlled for each divided area, the light emitting unit being disposed on the rear surface side of the second panel; a second panel control unit configured to control the transmittance of the second panel based on a brightness distribution of the light emitting unit so that the brightness of the transmitted light of the second panel becomes uniform; and a first panel control unit configured to control the transmittance of the first panel based on image data.

15 Claims, 12 Drawing Sheets

(56) References Cited

U.S. PATENT DOCUMENTS

2011/0267379 A1* 11/2011 Kurabayashi ........ G09G 3/3426
345/690
2012/0075274 A1    3/2012 Ueno et al.
2012/0147067 A1*  6/2012 Hashimoto .......... G09G 3/3413
345/690
2016/0232857 A1    8/2016 Tamaru

* cited by examiner

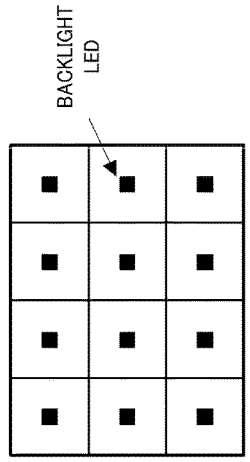
Fig.3B
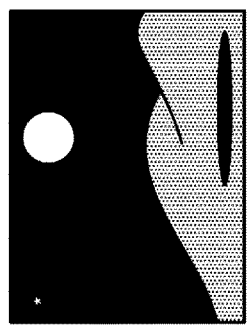
Fig.3A
INPUT IMAGE
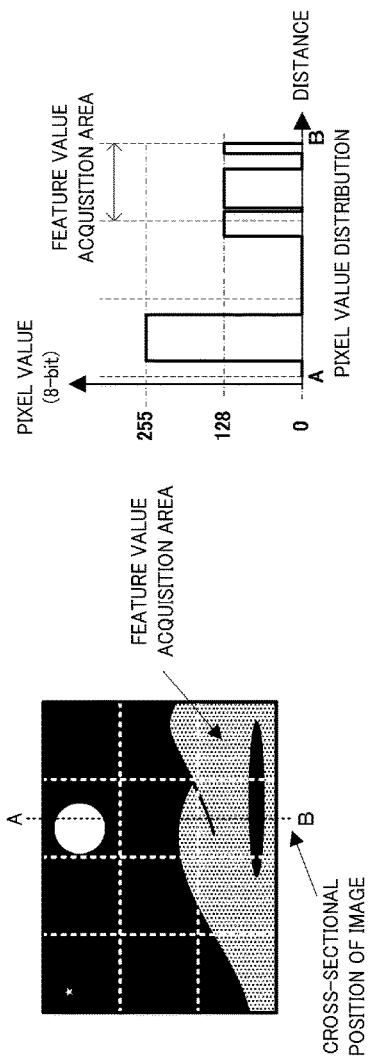
Fig.3D
Fig.3C

MAXIMUM PIXEL VALUE
OF EACH DIVIDED AREA

BACKLIGHT CONTROL VALUE OF
EACH DIVIDED AREA

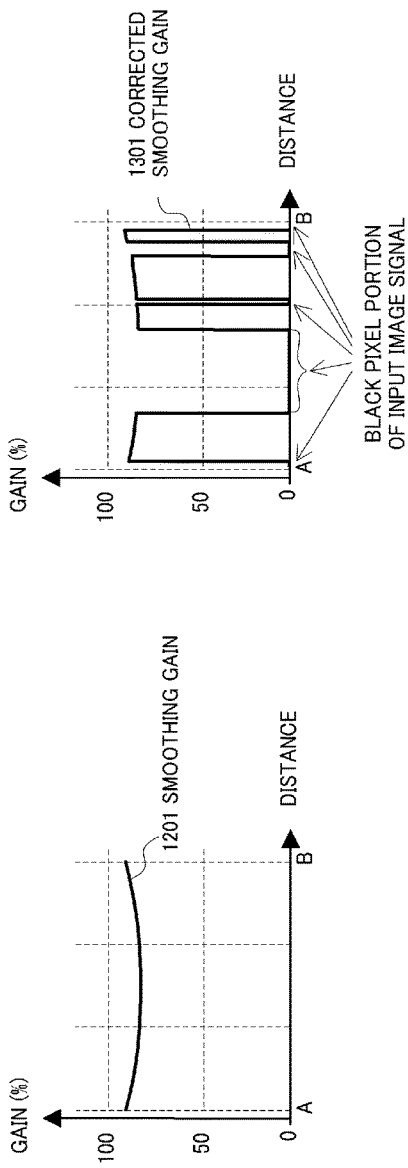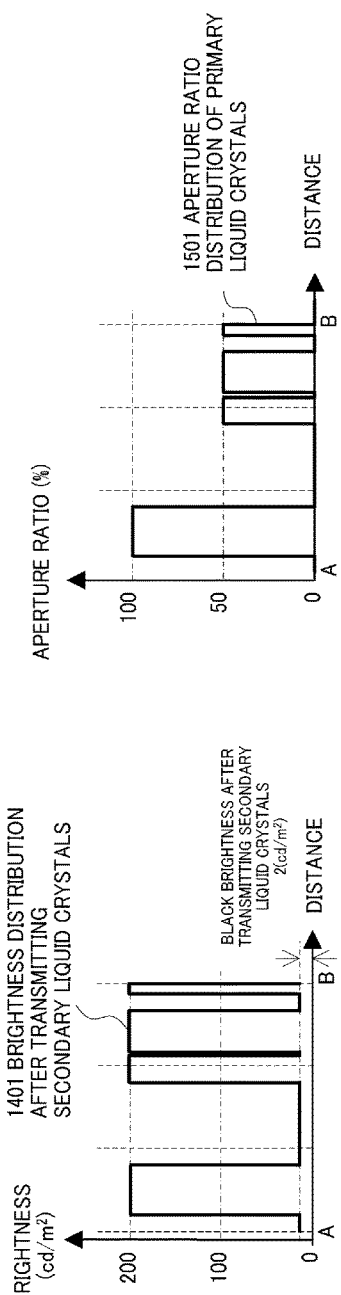
Fig.7A Fig.7B Fig.7C Fig.7D

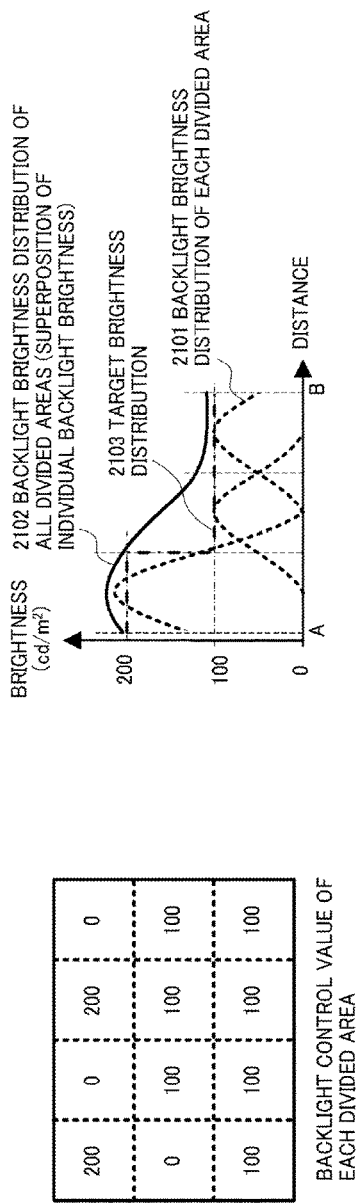
Fig.10A
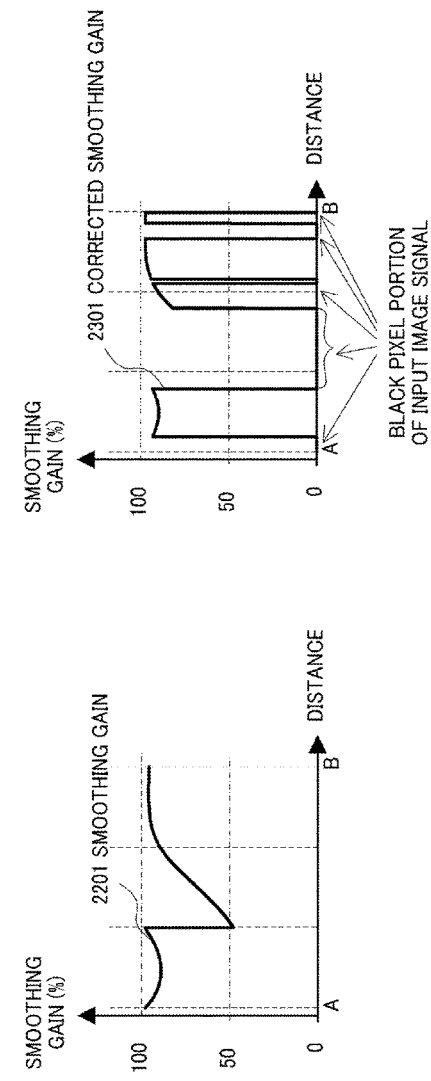
Fig.10B
Fig.10C
Fig.10D

DISPLAY DEVICE AND CONTROL METHOD THEREOF WITH BRIGHTNESS AND TRANSMITTANCE CONTROL

CROSS-REFERENCE TO RELATED APPLICATION

This application is a divisional of U.S. patent application Ser. No. 14/816,607, filed Aug. 3, 2015, which claims priority to Japanese Patent Application Nos. 2014-162831, filed Aug. 8, 2014, and 2015-097259, filed May 12, 2015, which are all herein incorporated by reference.

BACKGROUND OF THE INVENTION

Field of the Invention

The present invention relates to a display device and a control method thereof.

Description of the Related Art

A problem of a transmission type liquid crystal display device, of which liquid crystal panel is constituted by one panel, is a decrease in contrast caused by leakage of the backlight. One technique to improve the contrast is to insert a second liquid crystal panel (hereafter called "secondary liquid crystal panel") between a conventional first liquid crystal panel (hereafter called "primary liquid crystal panel") and a backlight. Thereby contrast can be improved because a gradation number equal to the product of the display gradation numbers of the two liquid crystal panels can be expressed (Japanese Patent Application Laid-Open No. H5-88197).

Another technique to improve the contrast is dividing a screen into a plurality of areas, and controlling the brightness of the backlight and transmittance of the liquid crystal panel for each divided area based on a feature value of the image data of each divided area. Thereby black floats can be suppressed and contrast can be improved (Japanese Patent Application Laid-Open No. 2002-99250).

SUMMARY OF THE INVENTION

If the brightness of the backlight is controlled for each divided area, the brightness of the backlight is distributed non-uniformly. The brightness of light (output brightness, display brightness) output from the liquid crystal panel of the display device is influenced by the brightness distribution of the backlight. If the brightness distribution of the backlight is not uniform, the brightness of the image data cannot be accurately reproduced in display. In Japanese Patent Application Laid-Open No. 2002-99250, the influence of an unsmooth brightness distribution of the backlight is offset by controlling the transmittance of the liquid crystal panel in accordance with the brightness distribution of the backlight.

To further increase the contrast, the backlight brightness must be reduced. In this case, the backlight brightness distribution decreases as the backlight brightness decreases. To offset the influence of the backlight brightness distribution, the transmittance of the liquid crystal panel must be increased in accordance with the reduction amount of the backlight brightness. In this case, if a display device constituted by one liquid crystal panel is used, the increased transmittance may exceed the controllable transmittance of the liquid crystal panel. Should this occur, the backlight transmitting through the liquid crystal panel cannot be controlled and high gradation cannot be expressed. As a result, the output image saturates and causes interference.

It is an object of the present invention to smoothen the backlight brightness distribution even when the brightness is controlled for each divided area, and to further reduce the black brightness in a display device constituted by a liquid crystal panel having a two-layer structure.

A first aspect of the present invention is a display device having: a first panel of which light transmittance is controlled; a second panel of which light transmittance is controlled, the second panel being disposed on a rear surface side of the first panel; a light emitting unit of which brightness is individually controlled for each divided area, the light emitting unit being disposed on a rear surface side of the second panel; a second panel control unit configured to control the transmittance of the second panel based on a brightness distribution of the light emitting unit so that the brightness of the transmitted light of the second panel becomes uniform; and a first panel control unit configured to control the transmittance of the first panel based on image data.

A second aspect of the present invention is a method of controlling a display device including: a first panel of which light transmittance is controlled; a second panel of which light transmittance is controlled, the second panel being disposed on a rear surface side of the first panel; and a light emitting unit of which brightness is individually controlled for each divided area, the light emitting unit being disposed on a rear surface side of the second panel, having: a second panel control step of controlling the transmittance of the second panel based on a brightness distribution of the light emitting unit, so that the brightness of the transmitted light of the second panel becomes uniform; and a first panel control step of controlling the transmittance of the first panel based on image data.

According to the present invention, the backlight brightness distribution can be smoothed when the backlight is controlled for each divided area, and the black brightness can be further reduced in the display device constituted by a liquid crystal panel having a two-layer structure.

Further features of the present invention will become apparent from the following description of exemplary embodiments with reference to the attached drawings.

BRIEF DESCRIPTION OF THE DRAWINGS

FIGS. 3A to 3D are a set of diagrams depicting an input image, a backlight configuration, divided areas and pixel values of a segment AB;

FIGS. 7A to 7D are a set of diagrams showing a smoothing gain, a corrected smoothing gain, a secondary liquid crystal brightness distribution, and a primary liquid crystal aperture ratio;

FIGS. 10A to 10D depict backlight control values, a brightness distribution, a smoothing gain and a corrected smoothing gain;

DESCRIPTION OF THE EMBODIMENTS

Example 1

Figure 1:
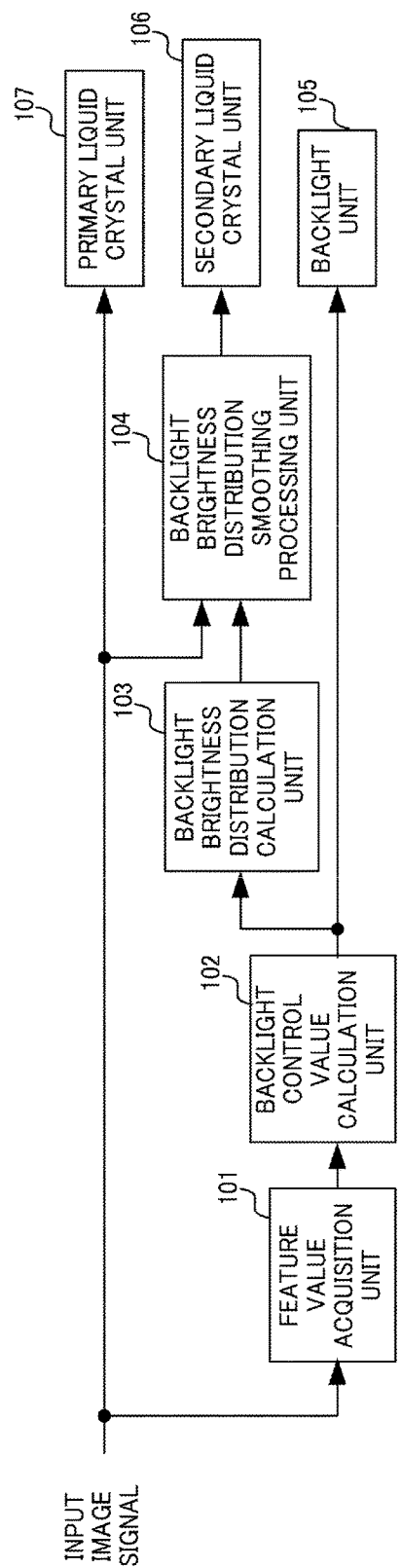
FIG. 1 is a functional block diagram of a display device of Example 1.
Figure 2:
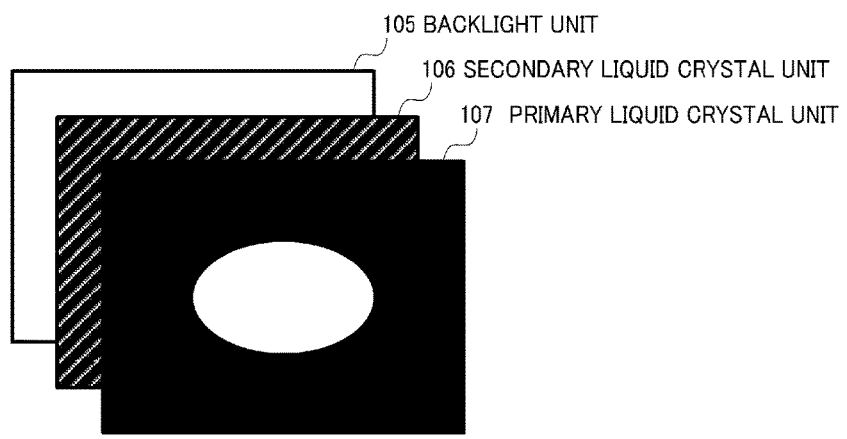
FIG. 2 is a diagram depicting a configuration of the display device of Example 1.

FIG. 1 is a block diagram depicting functions of a display device of Example 1, and FIG. 2 shows the configuration of the display device.

The display device of Example 1 has: a first panel of which light transmittance can be controlled; a second panel which is disposed on the rear surface side of the first panel and of which light transmittance can be controlled; and a light emitting unit which is disposed on the rear surface side of the second panel and of which brightness can be individually controlled for each divided area. In Example 1, as shown in FIG. 2, the first panel is a primary liquid crystal unit 107, the second panel is a secondary liquid crystal unit 106, and the light emitting unit is a backlight unit 105. The primary liquid crystal unit 107 is a display surface. In Example 1, the first panel and the second panel are both liquid crystal panel examples, but the first panel and the second panel are not limited to liquid crystal panels if they are display panels of which light transmittance can be controlled for each pixel. For example, a display panel based on a micro electro mechanical system (MEMS) shutter may be used.

The display device of Example 1 is constituted by a feature value acquisition unit 101, a control value calculation unit 102, a brightness distribution calculation unit 103, a smoothing processing unit 104, a backlight unit 105, a secondary liquid crystal unit 106 and a primary liquid crystal unit 107.

In the configuration in FIG. 1, the feature value acquisition unit 101 receives input image data, divides the image area into a plurality of areas, and acquires a feature value for each divided area. In Example 1, the feature value acquisition unit 101 acquires the maximum value of the pixel values in each divided area (hereafter called "maximum pixel value") as the feature value of each divided area. The maximum pixel value is transmitted to the control value calculation unit 102.

The control value calculation unit 102 receives the maximum pixel value in each divided area acquired by the feature value acquisition unit 101, and calculates the backlight control value (brightness control value) of each divided area in accordance with the maximum pixel value. The calculated backlight control value is transmitted to the brightness distribution calculation unit 103 and the backlight unit 105.

The brightness distribution calculation unit 103 receives the backlight control value of each divided area, which is calculated by the control value calculation unit 102, and calculates the brightness distribution of the light output from the backlight unit 105, based on the backlight control value of each divided area. The calculated brightness distribution information is transmitted to the smoothing processing unit 104.

The smoothing processing unit 104 receives the input image data and the brightness distribution information calculated by the brightness distribution calculation unit 103. The smoothing processing unit 104 executes the processing to smooth the backlight brightness distribution based on the received input image data and the brightness distribution information, and calculates the aperture ratio (transmittance) for each pixel of the secondary liquid crystal unit 106. The calculated aperture ratio information on the secondary liquid crystal unit 106 is transmitted to the secondary liquid crystal unit 106.

The backlight unit 105 receives the backlight control value calculated for each divided area by the control value calculation unit 102, and controls light emission of the light source of each divided area based on the received backlight control value.

The secondary liquid crystal unit 106 receives the aperture ratio of each pixel calculated by the smoothing processing unit 104, and performs the second panel control to control the liquid crystal element of each pixel based on the received aperture ratio.

The primary liquid crystal unit 107 receives the input image data, and performs the first panel control to control the liquid crystal element of each pixel based on the received image data.

The processing content of the display device according to Example 1 will be described using monochrome 8-bit input image data shown in FIG. 3A as an example. In Example 1, the primary liquid crystal unit 107 and the secondary liquid crystal unit 106 are monochrome liquid crystal panels having a same pixel size, and the backlight unit 105 is a white backlight. The image area (pixel size) of the input image data is 2048 pixels horizontally×1536 pixels vertically. The pixel values of the input image data are values in the 0 to 255 range, and are controlled such that the brightness of the output image (display brightness) of the primary liquid crystal unit 107 becomes 200 cd/m$^2$ when the pixel value is 255. The gamma value is 1.0. The contrast ratio of the primary liquid crystal unit 107 and that of the secondary liquid crystal unit 106 are both 100:1. These specifications are an example, and the display device to which the present invention is applied is not limited to the exemplified specifications. The following description should be read, as appropriate, according to the specifications of the display device to which the present invention is applied.

Figures 4A, 4B, 4C:
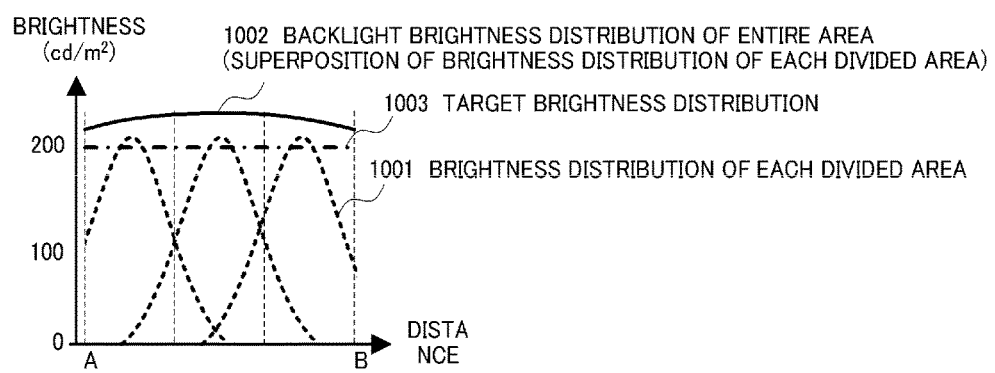
FIGS. 4A to 4C are a set of diagrams depicting maximum pixel values, backlight control values and brightness distribution.

In Example 1, the backlight unit 105 is constituted by three vertically divided areas×four horizontally divided areas as shown in FIG. 3B, and the brightness of the backlight unit 105 can be individually controlled for each divided area. The feature value acquisition unit 101 acquires the feature value of the divided area of the image data corresponding to each divided area of the backlight unit 105. FIG. 3C shows the divided areas for which feature values are acquired in the input image data. In the following description, to simplify description, one-dimensional image data on segment AB in FIG. 3C, out of the image data, will be described as an example. FIG. 3D shows a pixel value distribution of the one-dimensional image data on segment AB in FIG. 3C. FIG. 4A shows the result of the feature value (maximum pixel value) of each divided area output by the feature value acquisition unit 101.

Figure 5:
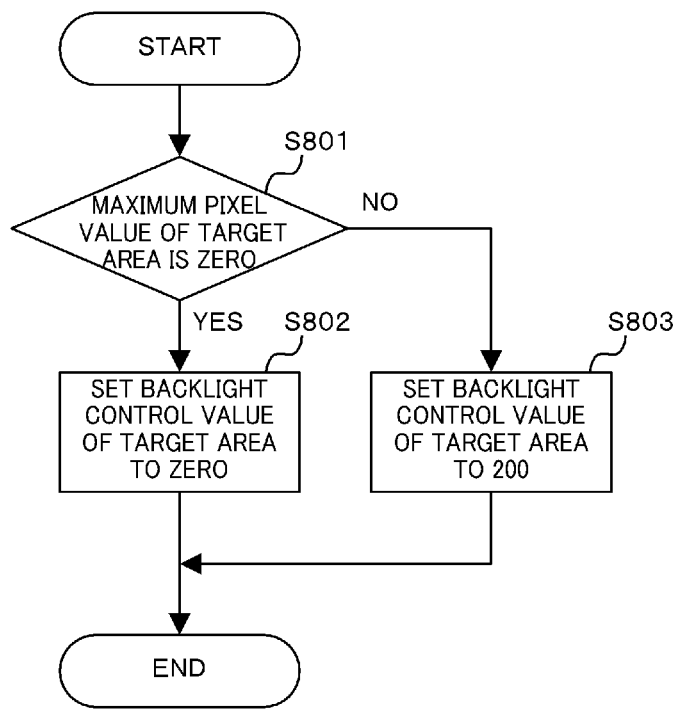
FIG. 5 is a flow chart depicting a method of calculating the backlight control value of Example 1.

An example of a calculation method of the backlight control value according to Example 1 will be described. In Example 1, the control value calculation unit 102 determines the backlight control value of each divided area as one of two types, depending on whether the maximum pixel value is zero or not. The backlight control value and the output brightness value are correlated. For convenience, in Example 1 it is assumed that the backlight control value is set in two levels: 0 or 200. Now the procedure of the calculation method of the backlight control value will be described with reference to the flow chart in FIG. 5. In step S801, the control value calculation unit 102 determines whether the maximum pixel value of the image data corresponding to the target divided area, for which the backlight control value is calculated, is zero or not. The control value calculation unit 102 sets the backlight control value to zero if the maximum pixel value is zero in step S802. And if the maximum pixel value is not zero, the control value calculation unit 102 sets the backlight control value to 200 in step S803. FIG. 4B shows the backlight control value of each divided area acquired by this processing.

An example of a calculation method of brightness distribution of light emitted by the backlight unit 105 before transmitting through the secondary liquid crystal unit 106, according to Example 1, will be described. In Example 1, it is assumed that the light source of each divided area of the backlight unit 105 is located at the center of each divided area, as shown in FIG. 3B. Each light source emits light in accordance with the backlight control value that is set in each divided area. The brightness distribution of the light from the light source of each divided area is assumed to conform to Gaussian distribution. The brightness distribution of the light in the entire area of the backlight unit 105 is assumed to be a total of the brightness distribution of each divided area according to the superposition principle of light. Therefore in the one-dimensional area along segment AB, the brightness distribution of each divided area and the brightness distribution of the entire area of the backlight unit 105 become graph 1001 and graph 1002 in FIG. 4C respectively. If the brightness distribution in the divided area after transmitting through the secondary liquid crystal unit 106 is smoothed to 200 cd/m$^2$, then processing becomes easier since correction of the input image data for smoothing the brightness distribution is unnecessary. The smoothed brightness distribution, after transmitting through the secondary liquid crystal unit 106 that is targeted, is a brightness distribution where the brightness in each divided area becomes uniform at a value in accordance with the backlight control value shown in FIG. 4B. The target brightness distribution is the brightness distribution indicated by graph 1003 in FIG. 4C. In FIG. 4C, the peak value of the brightness distribution in each divided area exceeds the target brightness distribution, which is 200 cd/m$^2$. This is allowable because brightness insufficiency at the edge of the divided area is prevented in the backlight brightness distribution in the entire area.

The smoothing processing for the backlight brightness distribution by the smoothing processing unit 104 of Example 1 will be described. The smoothing processing unit 104 calculates a smoothing gain which is set for the secondary liquid crystal unit 106, so that the backlight brightness distribution before transmitting through the secondary liquid crystal unit 106 indicated by graph 1002 in FIG. 4C is smoothed to the brightness distribution indicated by graph 1003 in FIG. 4C after transmitting through the secondary liquid crystal unit 106. By setting the smoothing gain calculated like this for the secondary liquid crystal unit 106, the brightness distribution after transmitting through the secondary liquid crystal unit 106 becomes uniform in all divided areas at 200 cd/m$^2$, as indicated by graph 1003 in FIG. 4C. However if this smoothing gain is simply set for the secondary liquid crystal unit 106, the brightness of black pixels (hereafter called "black brightness") in the output image becomes 2 cd/m$^2$, since the contrast ratio of the primary liquid crystal unit 107 is 100:1. In this case, the black brightness of the image output by the display device is determined only by the contrast ratio of the primary liquid crystal unit 107. To further reduce the black brightness, the smoothing processing unit 104 sets the aperture ratio (transmittance) of each pixel of the secondary liquid crystal unit 106 corresponding to the black pixel in the input image data to the minimum aperture ratio (transmittance) that can be set for the secondary liquid crystal unit 106. According to Example 1, in the smoothing gain calculated as described above, the smoothing processing unit 104 corrects the smoothing gain, which is set for each pixel corresponding to the black pixel in the input image data, to zero (corrected smoothing gain). If the corrected smoothing gain is set for the secondary liquid crystal unit 106, the black brightness of the output image becomes 0.02 cd/m$^2$, based on the product of the contrast ratio of the secondary liquid crystal unit 106 and that of the primary liquid crystal unit 107, and the black brightness can be further reduced. In this way, according to Example 1, the smoothing processing unit 104 determines the aperture ratio (transmittance) of the secondary liquid crystal unit 106 based on the brightness distribution of the entire area of the backlight unit calculated by the brightness distribution calculation unit 103 and the input image data.

Figure 6:
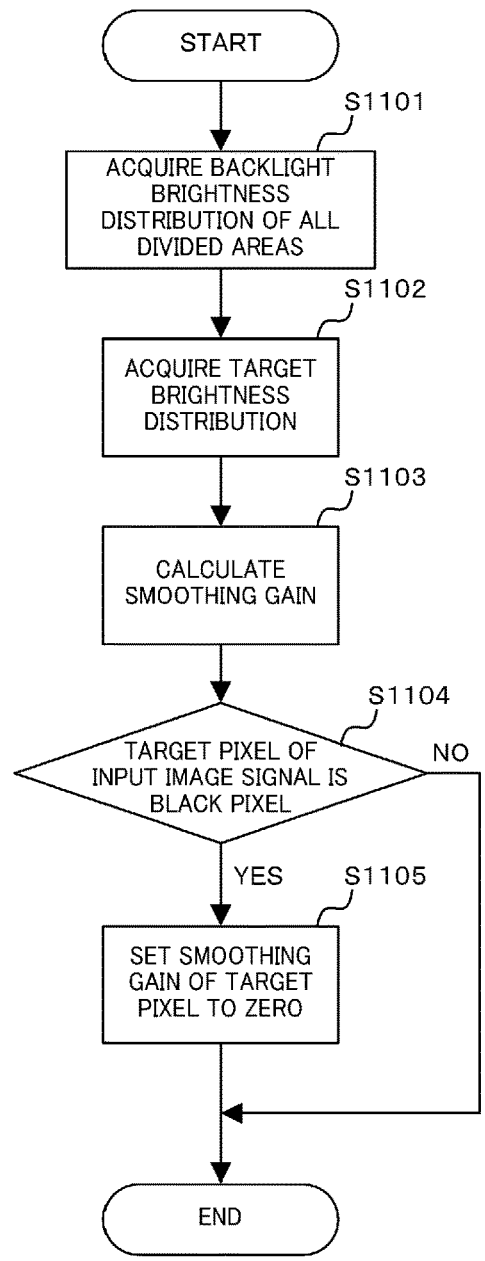
FIG. 6 is a flow chart depicting a method of calculating a corrected smoothing gain of Example 1.

The procedure of the processing to calculate the corrected smoothing gain will be described in detail with reference to the flow chart in FIG. 6. Here the one-dimensional position coordinate along segment AB of the secondary liquid crystal unit 106 is assumed to be Y.

In step S1101, the smoothing processing unit 104 acquires the brightness distribution LReal (Y) of the entire area of the backlight unit 105 from the brightness distribution calculation unit 103. The backlight brightness distribution of the entire area is the total of the brightness distribution of each divided area, as mentioned above, and is indicated by graph 1002 in FIG. 4C.

In step S1102, the smoothing processing unit 104 acquires the target brightness distribution LIdeal (Y) after transmitting through the secondary liquid crystal unit 106. Here as mentioned above, the target brightness distribution is set to 200 cd/m$^2$ in all of the divided areas in accordance with the backlight brightness value, and is indicated by graph 1003 in FIG. 4C.

In step S1103, the smoothing processing unit 104 calculates the smoothing gain Gain (Y) from the backlight brightness distribution of the entire area and the target brightness distribution. The smoothing gain Gain (Y) can be calculated by Expression 101.

$$\text{Gain}(Y) = L\text{Ideal}(Y)/L\text{Real}(Y) \quad \text{Expression 101}$$

Graph 1201 in FIG. 7A shows the distribution of the gain calculated by Expression 101. In this way, the smoothing processing unit 104 calculates the smoothing gain of each divided area of the secondary liquid crystal unit 106 based on the value obtained by dividing the brightness distribution of the entire area of the backlight unit, which is calculated by the brightness distribution calculation unit 103, by the backlight control value of each divided area determined by the control value calculation unit 102.

In step S1104, the smoothing processing unit 104 determines whether the target pixel for which the smoothing gain is calculated is a black pixel in the input image data, and if it is a black pixel, the smoothing processing unit 104 performs correction in step S1105 so that the smoothing gain of this pixel becomes zero. According to this procedure, the smoothing processing unit 104 calculates the corrected smoothing gain. The graph 1301 in FIG. 7B shows the corrected smoothing gain, which is calculated when the input image data shown in FIG. 3D is input.

According to this procedure, the brightness distribution after transmitting through the secondary liquid crystal unit 106 becomes 2 cd/m² in a position of a black pixel, and is 200 cd/m² in a pixel other than black in the input image data, as indicated by graph 1401 in FIG. 7C. This brightness distribution after transmitting the secondary liquid crystal unit 106 has been processed to smooth the backlight brightness distribution generated by the divided area control, hence no correction processing is necessary to smooth the image data to be input to the primary liquid crystal unit 107. Furthermore, the brightness distribution after transmitting the secondary liquid crystal unit 106 has been processed to reduce the black brightness, hence the black brightness of the output image of the primary liquid crystal unit 107 is further reduced, and higher contrast can be implemented. Even if the backlight brightness of the black image is reduced to further enhance contrast, correction processing for smoothing is not performed for the primary liquid crystal unit 107, therefore gradation is not saturated in the output image of the primary liquid crystal unit 107.

Figure 8A:
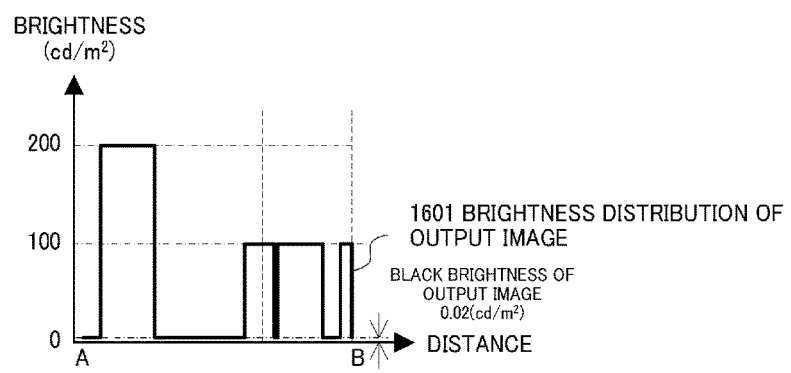
FIGS. 8A and 8B show brightness distribution of an output image and the output image.
Figure 8B:
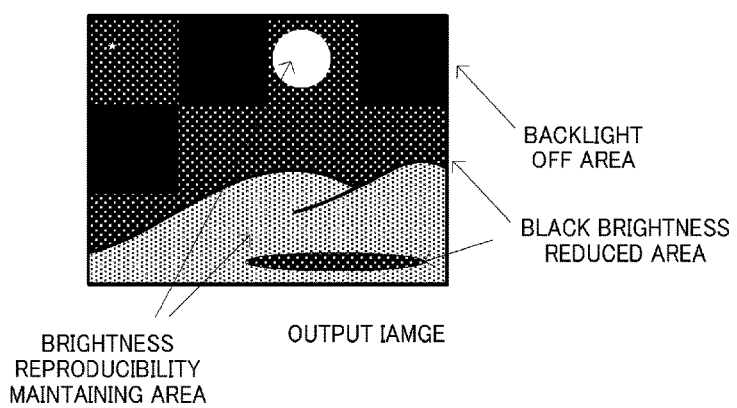

The effect of Example 1 will be described. In Example 1, the correction processing to smooth the backlight brightness distribution for the aperture ratio of the primary liquid crystal unit 107 is unnecessary. Therefore if the aperture ratio of the primary liquid crystal unit 107 is 100% when the input pixel value shown in FIG. 3D is 255, and is 0% when the input pixel value is 0, then the aperture ratio distribution of the primary liquid crystal unit 107 becomes as shown in FIG. 7D. The output brightness distribution of the primary liquid crystal unit 107 becomes the brightness distribution shown in FIG. 8A, based on the brightness distribution after transmitting the secondary liquid crystal unit 106 in FIG. 7C and the aperture ratio distribution of the primary liquid crystal unit 107 in FIG. 7D. This description concerns the processing on one-dimensional image data along segment AB as an example, but if a similar processing is executed on the entire image data, the output image (display image) of the primary liquid crystal unit 107, when the image data shown in FIG. 3A is input, becomes an image shown in FIG. 8B. As shown in FIG. 8B, the brightness of the input image data can be displayed with high reproducibility, and the black brightness is further reduced.

According to the configuration of Example 1, the display device is constituted by the liquid crystal panel having a two-layer structure and a backlight that performs divided area control, where the secondary liquid crystal unit 106 executes the smoothing processing for the brightness distribution of the backlight. This makes the image processing of the primary liquid crystal unit 107 easier. Further, a pixel of which pixel value in the input image data is zero becomes zero transmittance in both the secondary liquid crystal unit 106 and the primary liquid crystal unit 107, which allows implementing further reduction of the black brightness.

In Example 1, the case when the input image is a monochrome image was described as an example, but the input image may be a color image. In this case, it is preferable that a color liquid crystal panel is used for the liquid crystal panel. The brightness distribution of the backlight is smoothed by the secondary liquid crystal unit 106, hence if the white light source is disposed in each divided area of the backlight, it is preferable that a monochrome liquid crystal panel is used for the secondary liquid crystal unit 106. If a light source group constituted by light sources of a plurality of colors (e.g. RGB light source group) is disposed in each divided area of the backlight, it is preferable to use a color liquid crystal panel corresponding to the plurality of colors of the light source group for the secondary liquid crystal unit 106. In this case, it is preferable to control the transmittance of each color of the secondary liquid crystal unit 106 based on the brightness distribution of each color of the backlight, so that the brightness of the transmitted light of each color of the secondary liquid crystal unit 106 becomes uniform within each divided area. In Example 1, the number of the area divisions is 4×3 (=12), but the number of divisions is not limited to this.

Example 2

According to the calculation method of the backlight control value in Example 1, the backlight control value becomes 0 if the maximum pixel value acquired by the feature value acquisition unit 101 is zero in the target divided area for which the backlight control value is calculated, and becomes 200 if the maximum pixel value is a value other than zero. In Example 2, a case of controlling the backlight control value in multiple levels, in accordance with the feature value (e.g. maximum pixel value) of the divided area acquired by the feature value acquisition unit 101, will be described. Since the backlight control value is finely controlled in accordance with the feature value of the divided area, the black brightness can be further reduced and more power can be conserved compared with Example 1. In Example 2, a processing procedure, in the case when the present invention is applied to a display device which controls the backlight control value in multiple levels in accordance with the feature value of the divided area, will be described.

Figure 9:
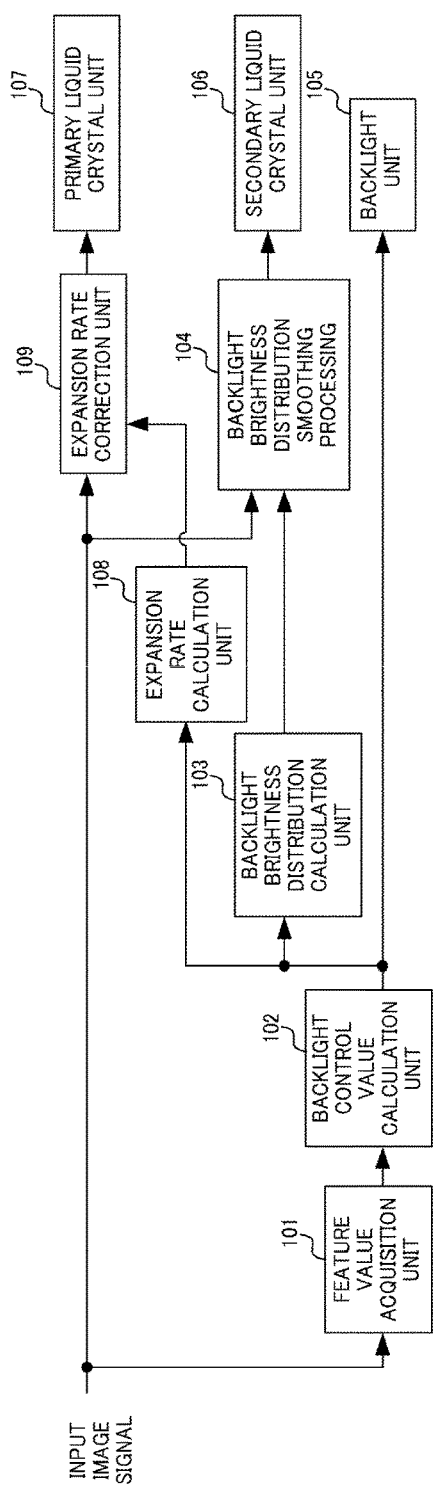
FIG. 9 is a functional block diagram of a display device of Example 2.

FIG. 9 shows a configuration of the display device of Example 2. The display device in FIG. 9 has the configuration of the display device in FIG. 1, to which an expansion rate calculation unit 108 and a correction unit 109 are added. The added-configuration will be described here.

The expansion rate calculation unit 108 receives the backlight control value of each divided area calculated by the control value calculation unit 102. The expansion rate calculation unit 108 calculates the expansion rate to execute the expansion processing on the input image data based on the backlight control value of each divided area. The calculated expansion rate is transmitted to the correction unit 109.

The correction unit 109 receives the expansion rate calculated by the expansion rate calculation unit 108 and the input image data. The correction unit 109 executes the expansion processing on the input image data based on the expansion rate. The expanded image data is transmitted to the primary liquid crystal unit 107.

The processing content of the display device of Example 2 will be described using the monochrome 8-bit input image data shown in FIG. 3A as an example, just like Example 1.

Figure 12C:
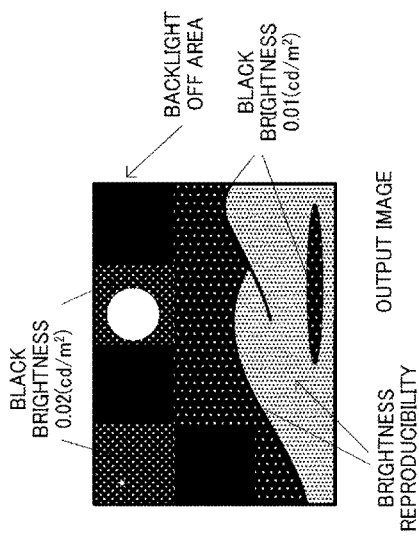
FIGS. 12A to 12C show a relationship among a maximum pixel value, a backlight control value, and an expansion ratio, and the output image.
Figure 12A:
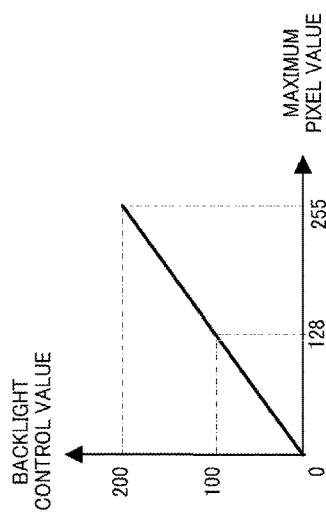

An example of the calculation method of the backlight control value will now be shown. In Example 2, the control value calculation unit 102 determines the backlight control value of each divided area in multiple levels in accordance with the maximum pixel value of each divided area. The control value calculation unit 102 determines the backlight control value of each divided area as shown in FIG. 10A based on the correspondence of the maximum pixel value indicated by the graph in FIG. 12A and the backlight control value, and the maximum pixel value of each divided area shown in FIG. 4A.

Example 2 shows an example of a calculation method of the backlight brightness distribution before transmitting through the secondary liquid crystal unit 106. Based on the same concept as Example 1, in a one-dimensional area along segment AB, the brightness distribution in each divided area and the brightness distribution in the entire area of the backlight unit 105 become like graph 2101 and graph 2102 in FIG. 10B respectively. The target brightness distribution after transmitting through the secondary liquid crystal unit 106 is a brightness distribution where the brightness in each divided area is uniform at a value in accordance with the backlight control value shown in FIG. 10A. The target brightness distribution becomes the brightness distribution indicated by graph 2103 in FIG. 10B.

An example of the smoothing processing for the backlight brightness distribution of Example 2 will be described. The smoothing processing unit 104 calculates a smoothing gain which is set for the secondary liquid crystal unit 106 from the backlight brightness distribution of the entire area and the target brightness distribution based on the same concept as Example 1. The smoothing gain becomes the distribution indicated by graph 2201 in FIG. 10C. The smoothing processing unit 104 also calculates the corrected smoothing gain just like Example 1. The corrected smoothing gain becomes the distribution indicated by graph 2301 in FIG. 10D.

In the expansion rate calculation processing according to Example 2, the black brightness reduction effect in Example 2 and the necessity of expansion rate calculation processing corresponding to the reduced black brightness will be described first.

Figure 11A:
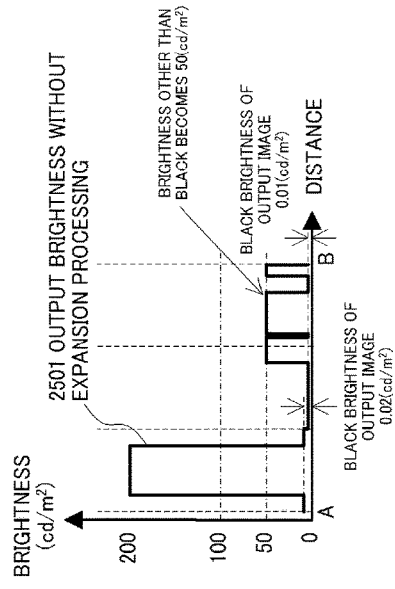
FIGS. 11A to 11D are a set of diagrams depicting a secondary liquid crystal brightness distribution, output brightness with/without expansion processing, and a primary liquid crystal aperture ratio.

After the processing procedure described thus far, the brightness distribution after transmitting through the secondary liquid crystal unit 106 becomes as indicated by graph 2401 in FIG. 11A. In FIG. 11A, in a divided area of which backlight control value is 200, the brightness after transmitting through the secondary liquid crystal unit 106 becomes 2 cd/m² at a position of a black pixel in the input image data, and becomes 200 cd/m² in positions other than black. In a divided area of which backlight control value is 100, on the other hand, the brightness after transmitting through the secondary liquid crystal unit 106 becomes 1 cd/m² at a position of a black pixel in the input image data, and becomes 100 cd/m² in positions other than black. In the brightness distribution after transmitting through the secondary liquid crystal unit 106, the brightness of a black pixel is further reduced in a divided area of which the backlight control value is low, and the brightness required for the primary liquid crystal unit 107 can be provided for pixels other than black pixels.

The expansion processing will now be described. If the aperture ratio of the primary liquid crystal unit 107 is set to values shown in FIG. 7D without performing the expansion processing on the input image data, the output brightness becomes like graph 2501 in FIG. 11B. As shown in FIG. 11B, the brightness of a pixel of which pixel value is 128 in the input image data becomes 50 cd/m², which is ¼ the brightness of a pixel of which pixel value is 255, and reproducibility of the brightness of the input image data is low. To prevent this, the correction unit 109 performs the expansion processing on the input image data corresponding to the reduction degree of the backlight control value which is in accordance with the feature value of each divided area. Thereby the output brightness becomes a brightness corresponding to the input image data.

An example of the calculation processing of the expansion rate according to Example 2 will be described. The reference value of the backlight control value is set to the maximum value (200 in this example) of the brightness control value calculated by the control value calculation unit 102. The reference value of the backlight control value is a backlight control value determined by the control value calculation unit 102 if the maximum pixel value is the upper limit value (255 in this example) of the pixel value. Here the backlight control value is 200, which is based on a value assumed to be an output brightness value (200 cd/m² in this example) when the maximum pixel value is the upper limit value of the image data. The correction unit 109 calculates the expansion rate such that the expansion rate becomes ×1 when the pixel value of the input image data is the upper limit value. Thereby the pixel values of the input image data after the expansion processing does not exceed the upper limit value. If the backlight control value of each divided area is BL and the expansion rate of each divided area is α, then expansion rate α of each divided area is calculated by Expression 201.

α=200/BL (where BL≥200/255)

α=255 (where BL<200/255)   Expression 201

Figure 12B:
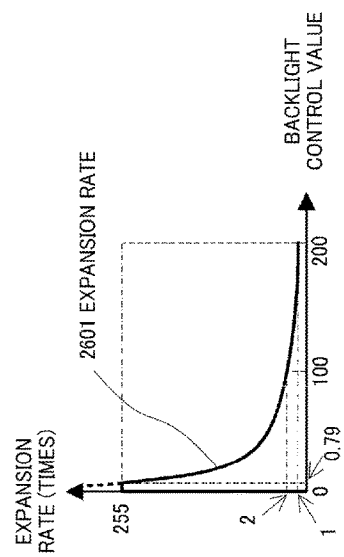

Here the expansion rate is a uniform predetermined value (255 in this example) for the divided areas of which backlight control value determined by the control value calculation unit 102 is smaller than the threshold (200/255 in this example). This is to prevent the expansion rate from exceeding 255. FIG. 12B shows the relationship between the expansion rate and the backlight control value.

Figure 11C:
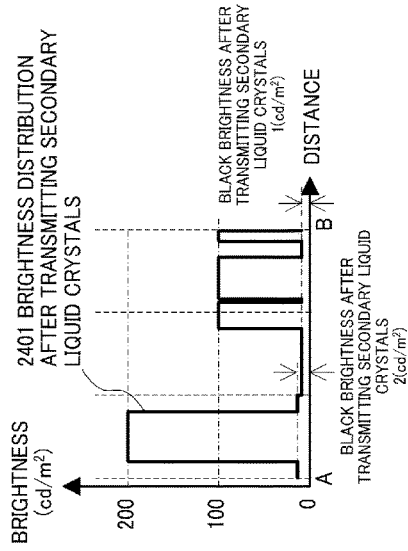
Figure 11B:
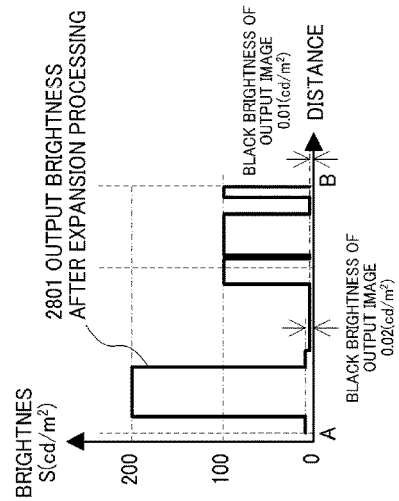
Figure 11D:
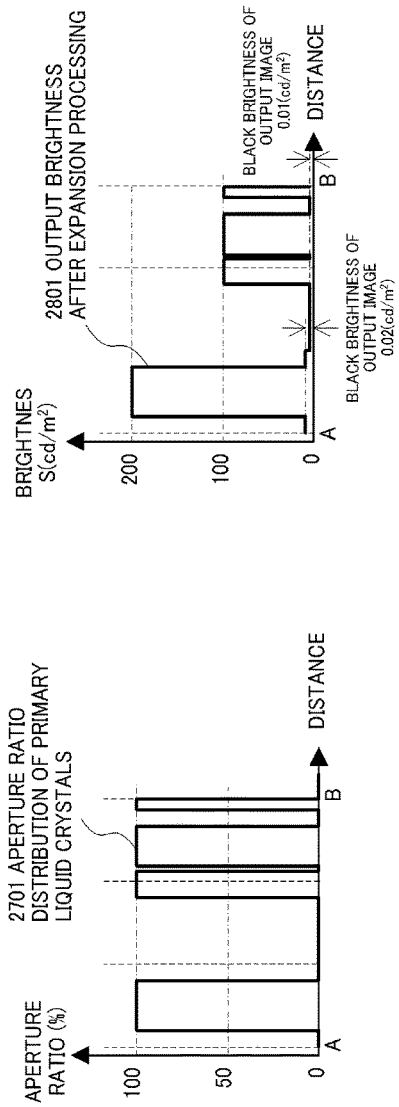

The aperture ratio of the primary liquid crystal unit 107, based on the input image data corrected with the expansion rate calculated by the above mentioned processing procedure, becomes like graph 2710 in FIG. 11C, and the brightness distribution of the output image becomes like graph 2801 in FIG. 11D. The output image becomes like FIG. 12C, where the brightness of the input image data is displayed with high reproducibility, and further reduction of black brightness (suppression of black floats) is implemented.

According to Example 2, the secondary liquid crystal unit 106 performs the smoothing processing of the backlight brightness distribution when the backlight control value is finely controlled in accordance with the feature value of each divided area, and the input image data is corrected with the expansion rate in accordance with the reduction degree of the backlight control value. Thereby the smoothing of the backlight brightness distribution and the reduction of the black brightness can be implemented in a display device constituted by a liquid crystal panel having a two-layer structure and a backlight.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-162831, filed on Aug. 8, 2014, and Japanese Patent Application No. 2015-097259, filed on May 12, 2015, which are hereby incorporated by reference herein in their entirety.

What is claimed is:

1. A display device comprising:
   a light emitting unit having a plurality of light emitting areas, light emitting of each of the plurality of light emitting areas being individually controllable;
   a first display panel configured to transmit irradiated light from the light emitting unit;
   a second display panel configured to transmit light transmitted by the first display panel and thereby to display an image in a screen;
   one or more processors; and
   a memory in communication with the one or more processors, the memory storing a program which, when executed by the one or more processors, cause the one or more processors to:
   acquire image data;
   control light emitting of each of the plurality of light emitting areas with an emission brightness determined based on a pixel value of image data area corresponding to each of the plurality of emission areas;
   control a transmittance of the first display panel based on an inverse of a brightness distribution of the irradiated light from the light emitting unit; and
   control a transmittance of the second display panel based on the image data.

2. The display device according to claim 1, wherein light emitting of a light emitting area corresponding to a first image data area, the maximum pixel value of pixel values in the first image data area being greater than a first threshold value, is controlled to be a higher emission brightness than an emission brightness which light emitting of a light emitting area corresponding to a second image data area, the maximum pixel value of pixel values in the second image data area not being greater than the first threshold value, is controlled to be.

3. The display device according to claim 1, wherein, as the maximum value of pixel values in an image data area is higher, the emission brightness of the light emitting area corresponding to the image data area is controlled to be higher.

4. The display device according to claim 1, wherein
   the light emitting unit emits white light,
   the first display panel transmits the white light and thereby monochromatic light is output, and
   the second display panel transmits the monochromatic light and thereby light of a plurality of colors is output.

5. The display device according to claim 1, wherein a transmittance of the first display panel corresponding to a pixel of the image data having a pixel value not greater than a second threshold value is controlled to be the minimum transmittance of the first display panel.

6. The display device according to claim 1, wherein the first and second display panels constitute a liquid crystal panel having a two-layer structure.

7. The display device according to claim 1, wherein the transmittance of the first display panel is controlled to be lower as the emission brightness of the irradiated light from the light emitting unit is higher.

8. A method of controlling a display device,
   the display device including:
   a light emitting unit having a plurality of light emitting areas, light emitting of each of the plurality of light emitting areas being individually controllable;
   a first display panel configured to transmit irradiated light from the light emitting unit; and
   a second display panel configured to transmit light transmitted by the first display panel and thereby to display an image in a screen,
   the method comprising steps of:
   acquiring image data;
   controlling light emitting of each of the plurality of light emitting areas with an emission brightness determined based on a pixel value of image data area corresponding to each of the plurality of emission areas;
   controlling a transmittance of the first display panel based on an inverse of a brightness distribution of the irradiated light from the light emitting unit; and
   controlling a transmittance of the second display panel based on the image data.

9. The method according to claim 8, wherein light emitting of a light emitting area corresponding to a first image data area, the maximum pixel value of pixel values in the first image data area being greater than a first threshold value, is controlled to be a higher emission brightness than an emission brightness which light emitting of a light emitting area corresponding to a second image data area, the maximum pixel value of pixel values in the second image data area not being greater than the first threshold value, is controlled to be.

10. The method according to claim 8, wherein, as the maximum value of pixel values in an image data area is higher, the emission brightness of the light emitting area corresponding to the image data area is controlled to be higher.

11. The method according to claim 8, wherein
    the light emitting unit emits white light,
    the first display panel transmits the white light and thereby monochromatic light is output, and
    the second display panel transmits the monochromatic light and thereby light of a plurality of colors is output.

12. The method according to claim 8, wherein a transmittance of the first display panel corresponding to a pixel of the image data having a pixel value not greater than a second threshold value is controlled to be the minimum transmittance of the first display panel.

13. The method according to claim 8, wherein the first and second display panels constitute a liquid crystal panel having a two-layer structure.

14. The method according to claim 8, wherein the transmittance of the first display panel is controlled to be lower as the emission brightness of the irradiated light from the light emitting unit is higher.

15. A non-transitory computer readable storage medium having stored thereon a computer program which, when executed by a computer, causes the computer, which control a display device including:
   a light emitting unit having a plurality of light emitting areas, light emitting of each of the plurality of light emitting areas being individually controllable;
   a first display panel configured to transmit irradiated light from the light emitting unit; and
   a second display panel configured to transmit light transmitted by the first display panel and thereby to display an image in a screen, to perform each of the steps of:
   acquiring image data;
   controlling light emitting of each of the plurality of light emitting areas with an emission brightness determined based on a pixel value of image data area corresponding to each of the plurality of emission areas;
   controlling a transmittance of the first display panel based on an inverse of a brightness distribution of the irradiated light from the light emitting unit; and
   controlling a transmittance of the second display panel based on the image data.

* * * * *